2

United States Patent Office 3,137,562
Patented June 16, 1964

3,137,562
HERBICIDAL COMPOSITIONS AND METHODS
Curt C. Leben, Wooster, Ohio, assignor to Eli Lilly and Company, Indianapolis, Ind., a corporation of Indiana
No Drawing. Filed Sept. 28, 1960, Ser. No. 58,886
13 Claims. (Cl. 71—2.5)

This invention relates to an improved method of killing weeds and to new selective herbicidal compositions having enhanced effectiveness.

It is well known that many substances have the power to kill all plants to which they are applied. Such substances are commonly referred to as "total herbicides." Other substances have the property of selectively destroying plants of certain types, commonly of the "broadleaf" variety, leaving plants of other classes largely unaffected. Substances of this sort are commonly referred to as "selective herbicides." The commercial application of herbicidally active substances has shown a tremendous increase in recent years, especially those herbicides of the selective type, such as the familiar and widely used 2,4-dichlorophenoxyacetic acid.

Many of the selective herbicidal compositions in present use have the disadvantage of limited effectiveness against one or more species of weeds. Such ineffectiveness of known compositions is often quite pronounced at a particular stage of the life cycle of the weed species, especially when the plant has reached or is approaching maturity. It is often not possible merely to apply greater amounts of presently known herbicidal compositions when resistance by the weeds is encountered, especially when selective killing effect is desired, since increased quantities of the herbicidal composition will then often endanger the growth of wanted plants. Furthermore, residues from the use of excessive quantities of the herbicidal composition can result in some instances in injury both to domestic animals and to man when used on or in proximity to garden plants, field crops, vegetative growths to be used for forage, and the like.

It is an object of this invention to provide selective herbicidal compositions of increased herbicidal effectiveness and selectivity. It is a further object to provide an improved and more efficacious method for killing weeds. Other objects will become apparent from the following disclosure.

In one aspect, the present invention is a novel composition comprising a selective-type herbicide and a growth-regulating substance of the gibberellic acid class.

In another aspect, the invention is an improved method for the selective destruction of weeds in the presence of other plants, employing for this purpose a combination of a selective-type herbicide and a growth-regulating substance of the gibberellic acid class.

The herbicidal component of my novel composition is chosen from the well-known class of selective herbicides, including, but not limited to, such types as the chlorinated aryloxyacetic acids, the aminotriazoles, the aminotriazines, the arylalkylureas, the N-phenylcarbamates, and the like. Illustrative herbicides of the selective type which can be employed singly or in combination in the compositions of my invention are as follows:

2,4-dichlorophenoxyacetic acid
2,4,5-trichlorophenoxyacetic acid
2-methyl-4-chlorophenoxyacetic acid
Isopropyl-4-(3-chlorophenyl)carbamate
3-amino-1,2,4-triazole
2-chloro-4,6-bis(diethylamino)-1,3,5-triazine
Maleic hydrazide
1-phenyl-3-methylurea
1-m-tolyl-3,3-dihexylurea
1-p-chlorophenyl-3-methylurea
3-p-chlorophenyl-1,1-dimethylurea
3-(3,4-dichlorophenyl)-1,1-dimethylurea
1-m-fluorophenyl-3,3-diethylurea Furthermore, in addition to the foregoing compounds a wide variety of metallic salts, amine and ammonium salts, esters, amides, and other derivatives thereof can be satisfactorily employed, such as the following:

Sodium 2,4-dichlorophenoxyacetate
Ammonium 2,4-dichlorophenoxyacetate
Ethyl 2,4-dichlorophenoxyacetate
Butyl 2,4-dichlorophenoxyacetate
Octyl 2,4-dichlorophenoxyacetate
Dimethylammonium 2,4-dichlorophenoxyacetate
Isopropylammonium 2,4-dichlorophenoxyacetate
Potassium 2,4,5-trichlorophenoxyacetate
Isopropyl 2,4,5-trichlorophenoxyacetate
Ethylammonium 2,4,5-trichlorophenoxyacetate
Methyl 2-methyl-4-chlorophenoxyacetate
Butyl N-(3-chlorophenyl)carbamate Other selective herbicides can be readily ascertained from the art relating to such substances. (See, for example, Frear, Chemistry of the Pesticides, Third Edition (1955), page 370, and the numerous examples cited therein.) In general, it can be said that the selective herbicides are operative as a class in my invention, although considerable variation is of course encountered among the various classes and species thereof with respect to the degree of enhancement obtained by combination with the gibberellins.

The plant-growth regulating substances used in my novel compositions are of the class commonly referred to in the literature as the "gibberelins." These substances primarily include gibberellin A ($C_{19}H_{24}O_6$, also called gibberellin A or dihydrogibberellic acid), gibberellin $A_2$ (tetrahydrogibberellic acid), and gibberellin $A_3$ ($C_{19}H_{22}O_6$, also known as gibberellin X or gibberellic acid).

Suitable also are the salts, esters, amides, and other derivatives of the gibberellic acids, all of said compounds being characterized by plant-growth promoting and regulating properties in varying degrees. Salts of the gibberellic acids which can be used are, for example, the ammonium salts, alkali-metal salts such as the sodium and the potassium salts, and amine salts such as the triethanolamine, pyridine, methylamine, isopropylamine, 2-ethylhexylamine salts, and the like. Suitable esters include the methyl, ethyl, n-propyl, isopropyl, n-butyl, hexyl, and octyl esters, and the like. Suitable amides include the unsubstituted amides, as well as the methylamides, dimethylamides, ethylamides, diethylamides, butylamides, and the like. Other derivatives include acetylgibberellic acid, diacetylgiberellic acid, methyl acetylgibberellate, monobenzoylgibberellic acid, butyl acetylgibberellate, isopropyl acetylgibberellate, butyrylgibberellic acid, octyl giberellate, ethyl acetylgibberellate, phenyl acetylgibberellate, calcium gibberellate, as well as the corresponding derivatives of the other gibberellic acids, as noted above.

Any one, or any combination, of the gibberellin plant-growth regulating substances can be used in the compositions of my invention.

Gibberellic acid can be readily produced in large quantities by cultivation of a gibberellate-producing organism such as the fungus *Gibberella fujikuroi*, using submerged culture fermentation methods, as described in Brian et al. U.S. Pat. 2,842,051, issued July 8, 1958. Further information on the preparation and properties of the gibberellins will be found in the following publications: Archives of Biochemistry and Biophysics, 54, 240 (1955); Bull. Agr. Chem. Soc. Japan, 19, 278 (1955); ibid., 21, 71 (1957); ibid., 21, 73 (1957); ibid., 21, 327 (1957); Arch. Biochem. and Biophys., 66, 438 (1957); J. Chem. Soc., 1954, 4670; Chem. and Ind., 1956, 954; ibid., 1954, 1066; and Experientia, 13, 487 (1957).

The amount of gibberellin to be incorporated with the selective herbicide ingredient to provide a herbicidal composition with enhanced weed-killing power can be varied within wide limits. No single optimum ratio of gibberellin to herbicidal ingredient can be specified that will provide the greatest enhancement of weed-killing power of the herbicidal ingredient incorporated in a composition, since an optimum ratio is dependent upon such grossly variable factors as the herbicidal potency of the selective herbicide employed, the species and age of the weed growth to be treated, the degree of selectivity of killing desired, climatic conditions, and the like. Therefore, the best ratio of gibberellin to herbicidal ingredient under one set of circumstances quite possibly will be too small or too great to provide the most efficacious results in another situation. Broadly speaking, however, the ratio of gibberellin to herbicidal ingredient affording the optimum weed killing potency will generally fall in the range of about 0.001 to about 1 part of gibberellin to 1 part of the employed herbicide ingredient, weight basis.

Because of the enhanced herbicidal activity of my compositions, it is possible by their use to obtain the desired weed-killing results with application of a lesser amount of the herbicidal ingredient than is necessary in compositions heretofore available. Generally, such increase or enhancement of activity is in the order of about 10 percent to about 1000 percent. It will be apparent, therefore, that substantially less of the selective herbicide ingredient is generally required for a given purpose when employing new compositions.

My herbicidal compositions can be applied to the desired locus by any conventional means such as by dusting or by spraying. The compositions can be provided for application in such forms as solutions, pellets, dusts, emulsions, aerosols, pastes, and dispersions by utilizing different extenders and carriers. Concentrated preparations of my compositions can be prepared in organic solvents and in wettable powder forms for convenience in shipping and storing. Such concentrated preparations are then diluted for spraying, preferably with water, at the time and place of use. I prefer to store my compositions in dry form since the active ingredients of my compositions are frequently more stable in the absence of moisture.

Dusting forms of my compositions are provided by employing a solid inert carrier such as finely divided clays, silicates, talcs, and other carriers commonly used in such herbicidal compositions.

Suitable additives common to the herbicidal composition art can be employed as desired in my compositions, such substances including wetting agents, preservatives, adhesives, stabilizers, dispersing agents, emulsifying agents, surface-active agents, and the like. The determination of the nature and amount of such substances to be used is well within the skill of the art, and it is accordingly unnecessary to set them out here in detail. However, the final concentration of such additives will usually not exceed about 10 percent. Such materials as insecticides, fungicides, soil conditioners, and fertilizers can be included in my compositions if a multiple-function formulation is desired.

I have found that application of a freshly prepared spray is a preferred means of applying my new compositions to weed growth. It is convenient in spraying a weed growth to adjust the concentration of my composition in the spray so that the spraying can be done to the point of "run-off."

The following specific examples will more clearly illustrate my invention. All quantities are expressed in parts by weight except where noted.

EXAMPLE 1

*Dust Formulation*

The following preparations are adapted for application to weeds as a dust, utilizing conventional dusting devices. The preparations are made by thoroughly mixing the ingredients and grinding the mixture to a particle size of not more than about 50 microns.

PREPARATION A

| | Parts |
|---|---|
| 2,4-dichlorophenoxyacetic acid | 5 |
| Gibberellic acid, triethanolamine salt | 1 |
| Fuller's earth | 94 |

PREPARATION B

| | |
|---|---|
| 3 - (3,4 - dichlorphenyl) - 1,1 - dimethylurea | 4 |
| Gibberellic acid, sodium salt | 2 |
| Cottonseed oil | 2 |
| Talc | 92 |

EXAMPLE 2

*Wettable Powders*

The following powders are adapted for dispersion or dissolving in water for application to weeds as a spray. The listed ingredients are admixed thoroughly and ground to a particle size not exceeding about 50 microns. For application, one part of the mixture is dissolved or dispersed in about 200 to 600 parts of water, stirred thoroughly, and applied to the weed growth, employing conventional spray equipment.

PREPARATION A

| | Parts |
|---|---|
| 2,4,5 - trichlorophenoxyacetic acid, isopropylamine salt | 70 |
| Gibberellic acid, potassium salt | 10 |
| Bentonite | 15 |
| Sodium lauryl sulfate (surface-active agent) | 2 |
| Methylcellulose (emulsifying agent) | 3 |

PREPARATION B

| | |
|---|---|
| 3-amino-1,2,4-triazole | 70 |
| Gibberellic acid, sodium salt | 12 |
| Alkylated arylpolyether alcohol (surface-active and dispersing agent) | 2 |
| Ethylene oxide stearate-laurate (emulsifying agent) | 2 |
| Bentonite | 14 |

PREPARATION C

| | |
|---|---|
| Isopropyl N-(3-chlorophenyl)carbamate | 70 |
| Gibberellic acid, potassium salt | 10 |
| Sodium lauryl sulfate (surface-active agent) | 2 |
| Polyoxyethylene sorbitan monolaurate (dispersing agent) | 3 |
| Bentonite | 15 |

EXAMPLE 3

*Water-Dispersible Liquid Preparations*

The following liquid preparations are adaptable to dilution with water to give aqueous dispersions to be used as sprays for application to weeds. The preparation is thoroughly mixed and dispersed. About one volume of the preparation is diluted with about 100 to 500 volumes of water and mixed thoroughly for use as a spray. Conventional spraying equipment can be used in applying the resulting spray to the weed growths.

PREPARATION A

| | Parts |
|---|---|
| 4,6-bis(diethylamino)-2-chloro-1,3,5-triazine | 25 |
| Gibberellic acid | 10 |
| Polyoxyethylene sorbitan monolaurate (surface-active and dispersing agent) | 3 |
| Methylcellulose (emulsifying agent) | 1 |
| Refined kerosene | 40 |
| Isopropanol | 21 |

PREPARATION B

| | Parts |
|---|---|
| 2,4-dichlorophenoxyacetic acid, butyl ester | 30 |
| Gibberellic acid | 5 |
| Alkylated arylpolyether alcohol (surface-active agent) | 2 |
| Methylcellulose (emulsifying agent) | 3 |
| Oil (light motor grade) | 60 |

EXAMPLE 4

*2,4-Dichlorophenoxyacetic Acid*

The following tests were carried out to compare the herbicidal effectiveness of a mixture of 2,4-dichlorophenoxyacetic acid and gibberellic acid with that of each of the substances alone.

Weed plots containing a mixture of mouse-ear, common purslane, pigweed, and common smartweed seedlings were sprayed at separate areas with aqueous solutions of 2,4-dichlorophenoxyacetic acid alone, gibberellic acid alone, and a combination of the two substances. Two to eight days after spraying, observations of the sprayed plants for herbicidal effects showed results as set forth in the following table:

TABLE I

| Herbicide, p.p.m. | Gibberellic Acid, p.p.m. | Effect on Plants [1] |
|---|---|---|
| 0 | 10 | + |
| 0 | 100 | + |
| 500 | 0 | 1 |
| 500 | 100 | 3 |
| 1,000 | 0 | 4 |
| 1,000 | 10 | 5 |
| 1,000 | 100 | 6 |
| 5,000 | 0 | 5 |
| 5,000 | 10 | 6 |
| 5,000 | 100 | 6 |

[1] + indicates better growth than control; 1=very little injury; 2=more injury but plants survived; 3=more injury than (2) but plants survived; 4=some plants died but most survived; 5=many plants died and few survived; 6=all plants died.

From the foregoing it will be observed that when a spray containing either 10 or 100 parts per million of gibberellic acid alone was sprayed on the test plants, a beneficial effect was observed. However, when the same concentrations of gibberellic acid were combined with the selective-type herbicide, the herbicidal effect of the combination was markedly and consistently greater than that obtainable by the same concentration of the selective-type herbicide alone.

EXAMPLE 5

*3-Amino-1,2,4-Triazole*

3-amino-1,2,4-triazole was tested according to the procedure of Example 4, with the following results:

TABLE II

| Herbicide, p.p.m. | Gibberellic Acid, p.p.m. | Effect on Plants |
|---|---|---|
| 0 | 10 | + |
| 0 | 100 | + |
| 1,000 | 0 | 1 |
| 1,000 | 10 | 2 |
| 1,000 | 100 | 3 |

EXAMPLE 6

*2,4-Dichlorophenoxyacetic Acid*

In each of a series of flats, 300 seeds each of Rumex, chickweed, and English plantain were planted, and the flats were maintained under favorable growing conditions in a hothouse. At two, four, or six weeks after planting, half of each flat was treated with an aqueous spray composition as set out below in Table III, while the other half of the flat was sprayed with an equivalent amount of water.

About four weeks after spraying, observation of the sprayed plants for herbicidal effects showed the results set forth in the table, where the effect upon the plants is expressed as in Example 4:

TABLE III

| Herbicide, p.p.m. | Gibberellic Acid, p.p.m. | Effect on Plants |
|---|---|---|
| 0 | 10 | + |
| 0 | 100 | + |
| 100 | 0 | 1 |
| 100 | 10 | 2 |
| 100 | 100 | 3 |
| 500 | 0 | 4 |
| 500 | 100 | 5 |

EXAMPLE 7

*3-(3,4-Dichlorophenyl)-1,1-Dimethylurea*

Rye grass seeds were planted in flats and maintained under favorable growing conditions in a hothouse. After twenty-two days, a series of the flats were separately treated over half of their area with one of the spray compositions designated in the following table, while the other halves of the flats were sprayed with an equivalent amount of water.

About four weeks after spraying, observations of the sprayed plants for herbicidal effects showed the results set forth in the following table, where the effect upon the plants is expressed as in Example 4.

TABLE IV

| Herbicide, p.p.m. | Gibberellic Acid, p.p.m. | Effect on Plants |
|---|---|---|
| 0 | 10 | + |
| 0 | 100 | + |
| 200 | 0 | 1 |
| 200 | 10 | 2 |
| 200 | 100 | 3 |

EXAMPLE 8

*Isopropyl N-(3-Chlorophenyl)Carbamate*

Flats of rye grass were tested as in Example 7, with the following results:

TABLE V

| Herbicide, p.p.m. | Gibberellic Acid, p.p.m. | Effect on Plants |
|---|---|---|
| 0 | 10 | + |
| 0 | 100 | + |
| 5,000 | 0 | 1 |
| 5,000 | 10 | 2 |
| 5,000 | 100 | 3 |

This application is a continuation-in-part of my application Serial No. 689,745, filed October 14, 1957, now abandoned.

I claim:

1. A selectively herbicidal composition of improved herbicidal effectiveness which comprises a plant-growth regulating substance selected from the group consisting of the gibberellic acids and the salts, esters, and amides thereof in admixture with an organic selective herbicide chosen from the group consisting of the chlorinated aryloxyacetic acids, the aminotriazoles, the aminotriazines, the arylalkylureas, and the N-phenylcarbamates, said plant-growth regulating substance being present in the proportion of about 0.001 to about 1 part by weight to each part by weight of said selective herbicide, and said composition containing said mixture in herbicidal concentration.

2. A selectively herbicidal composition of improved herbicidal effectiveness which comprises a plant-growth regulating substance selected from the group consisting of the gibberellic acids and the salts, esters, and amides thereof in admixture with a selectively herbicidal chlorinated phenoxyacetic acid, said plant-growth regulating substance being present in said composition in a proportion between about 0.001 and about 1 part by weight to each part of said chlorinated phenoxyacetic acid, and said composition containing said mixture in herbicidal concentration.

3. The composition of claim 2 wherein said chlorinated phenoxyacetic acid is 2,4-dichlorophenoxyacetic acid.

4. The composition of claim 2 wherein said chlorinated phenoxyacetic acid is 2,4,5-trichlorophenoxyacetic acid.

5. A selectively herbicidal composition of improved herbicidal effectiveness which comprises a plant-growth regulating substance selected from the group consisting of the gibberellic acids and the salts, esters, and amides thereof in admixture with a selectively herbicidal aminotriazole, said plant-growth regulating substance being present in said composition in a proportion between about 0.001 and about 1 part by weight to each part of said aminotriazole, and said composition containing said mixture in herbicidal concentration.

6. The composition of claim 5 wherein said aminotriazole is 3-amino-1,2,4-triazole.

7. A selectively herbicidal composition of improved herbicidal effectiveness which comprises a plant-growth regulating substance selected from the group consisting of the gibberellic acids and the salts, esters, and amides thereof in admixture with a selectively herbicidal aminotriazine, said plant-growth regulating substance being present in said composition in a proportion between about 0.001 and about 1 part by weight to each part of said aminotriazine, and said composition containing said mixture in herbicidal concentration.

8. The composition of claim 7 wherein said aminotriazine is 4,6-bis-(diethylamino)-2-chloro-1,3,5-triazine.

9. A selectively herbicidal composition of improved herbicidal effectiveness which comprises a plant-growth regulating substance selected from the group consisting of the gibberellic acids and the salts, esters, and amides thereof in admixture with a selectively herbicidal arylalkylurea, said plant-growth regulating substance being present in said composition in a proportion between about 0.001 and about 1 part by weight to each part of said arylalkylurea, and said composition containing said mixture in herbicidal concentration.

10. The composition of claim 9 wherein said arylalkylurea is 3-(3,4-dichlorophenyl)-1,1-dimethyl urea.

11. A selectively herbicidal composition of improved herbicidal effectiveness which comprises a plant-growth regulating substance selected from the group consisting of the gibberellic acids and the salts, esters, and amides thereof in admixture with a selectively herbicidal N-phenylcarbamate, said plant-growth regulating substance being present in said composition in a proportion between about 0.001 and about 1 part by weight to each part of said N-phenylcarbamate, and said composition containing said mixture in herbicidal concentration.

12. The composition of claim 11 wherein said N-phenylcarbamate is isopropyl N-(3-chlorophenyl)carbamate.

13. A selectively herbicidal composition of improved herbicidal effectiveness which comprises a plant-growth regulating substance selected from the group consisting of the gibberellic acids and the salts, esters, and amides thereof in admixture with an organic selective herbicide chosen from the group consisting of the chlorinated aryloxyacetic acids, the aminotriazoles, the aminotriazines, the arylalkylureas, and the N-phenylcarbamates, and an inert carrier, said plant-growth regulating substance being present in the proportion of about 0.001 to about 1 part by weight to each part by weight of said selective herbicide, and said composition containing said mixture in herbicidal concentration.

References Cited in the file of this patent

UNITED STATES PATENTS

| 2,670,282 | Allen | Feb. 23, 1954 |
| 2,709,648 | Ryer et al. | May 31, 1955 |
| 2,842,051 | Brian et al. | July 8, 1958 |

FOREIGN PATENTS

| 598,105 | Great Britain | Feb. 10, 1948 |

OTHER REFERENCES

Crocker: "Growth of Plants," publ. Reinhold Publ. Corp., N.Y., 1948, page 216.

Chemical and Engineering News, September 17, 1956 pages 4496 and 4501.

Whaley in "Science," vol. 125, February 8, 1957, page 234.